June 21, 1955  R. E. McINTYRE  2,711,050
FISHING TACKLE BOX
Filed March 17, 1953  2 Sheets-Sheet 2
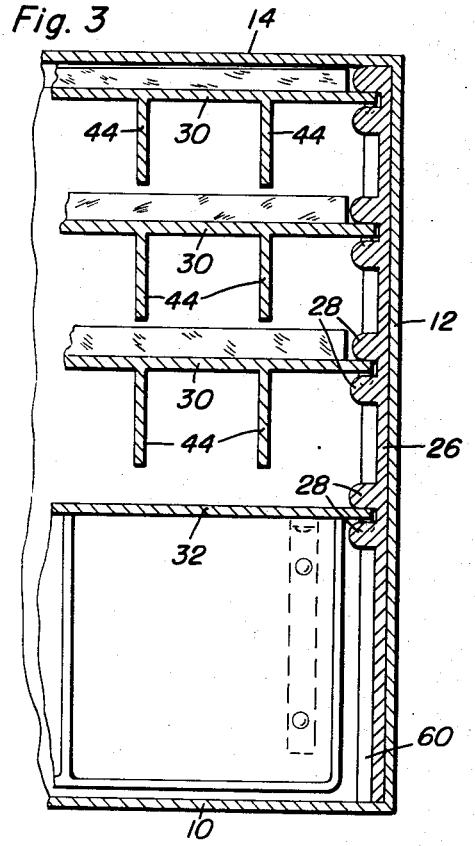
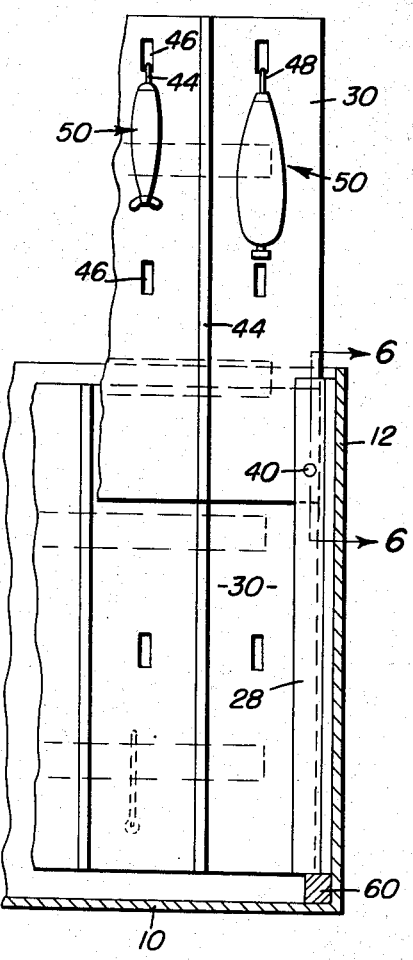
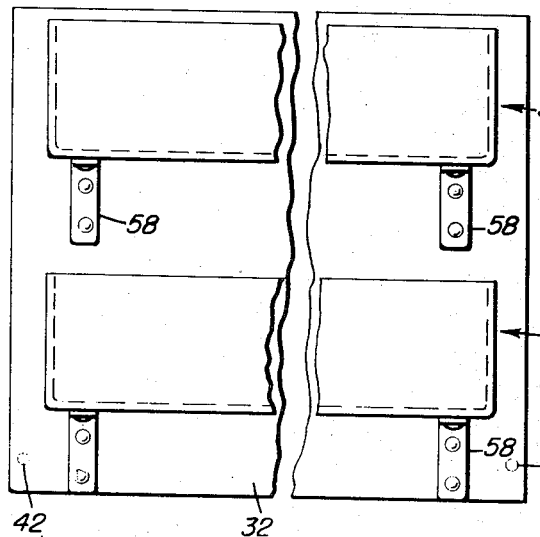
Raymond E. McIntyre
INVENTOR.
BY Clarence A. O'Brien
and Harvey B. Jacobson

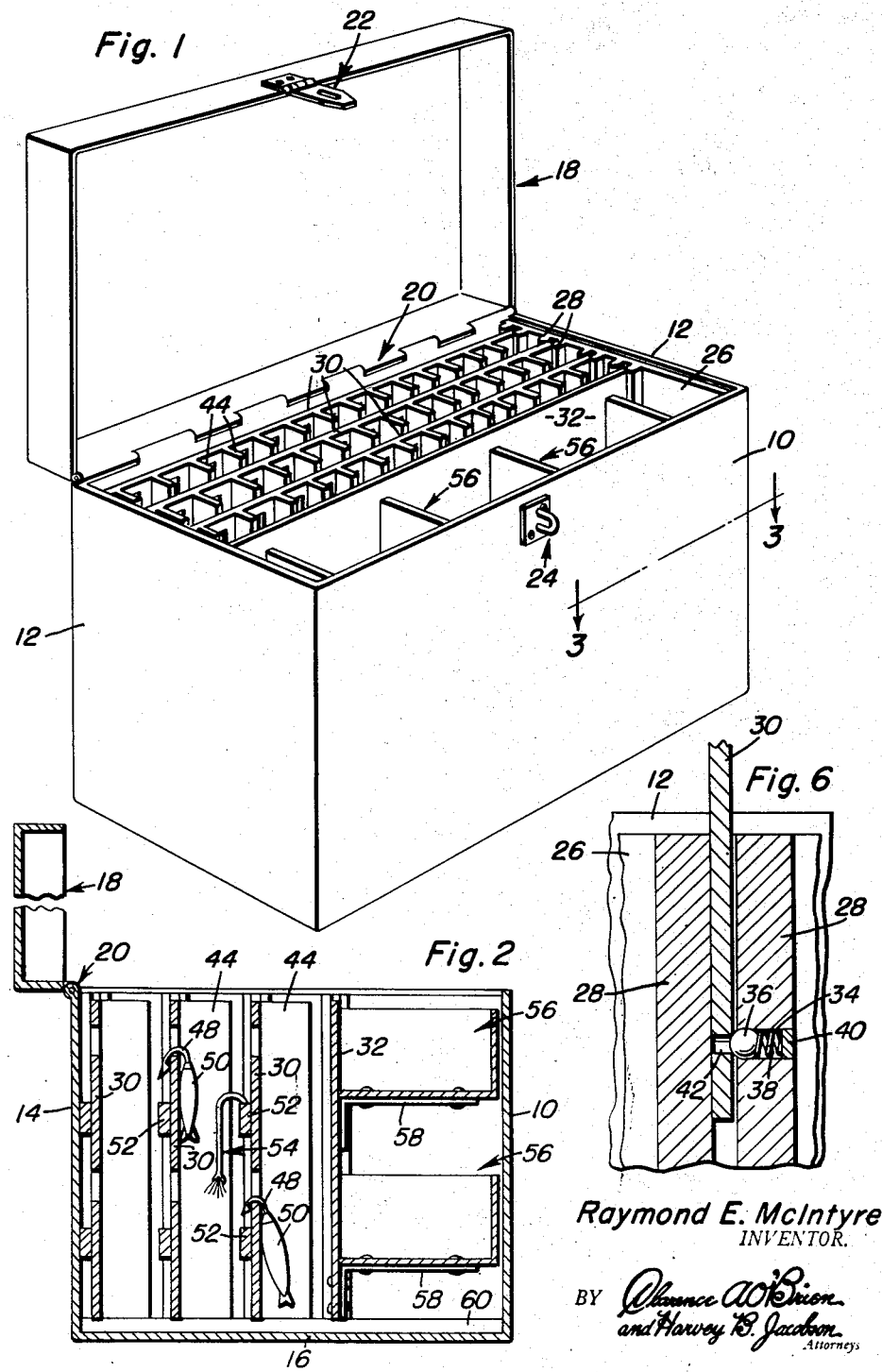

United States Patent Office 2,711,050
Patented June 21, 1955

2,711,050

FISHING TACKLE BOX

Raymond E. McIntyre, Mishawaka, Ind.

Application March 17, 1953, Serial No. 342,807

7 Claims. (Cl. 43—57.5)

This invention relates to fishermen's accessories and more particularly to a tackle box presenting a convenient and readily accessible container for fishermen's equipment.

A primary object of this invention is to provide a tackle box which is provided with means utilizing the storage space in a most efficient manner.

Another object of this invention is to provide a tackle box presenting a plurality of individual storage spaces within which artificial lures and the like may be placed so as to be readily accessible and free from entanglement with other similar lures.

Another object of this invention is to provide a tackle box in conformity with the foregoing objects in which the storage spaces are formed by a plurality of partition members which are movable outwardly of the tackle box in individual fashion so that fishing lures or the like carried thereby may be inspected and selected individually at will.

Another object of this invention is to provide a tackle box which sub-divides in confining space into a plurality of storage spaces within which fishing lures and the like may be suspended.

Another object of this invention is to provide a tackle box having several vertically disposed plate members adapted to carry fishing lures and the like which are vertically slidable outwardly of the box and in which means are provided for maintaining the plate members in extended position.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the novel tackle box with its lid upraised and showing the interior disposition of the component parts of the box;

Figure 2 is a transverse vertical section of the box as shown in Figure 1 and showing the manner of suspending fishing lures and the like from the vertical plate members;

Figure 3 is a horizontal section taken substantially along the plane of section line 3—3 of Figure 1 showing details of the vertical plate and end wall on an enlarged scale;

Figure 4 is a vertical section of one end of the tackle box showing one of the plate members in upwardly extended position;

Figure 5 is an elevation of portions of the front plate member; and

Figure 6 is a vertical section taken substantially along the plane of section line 6—6 of Figure 4 and showing the latching means for maintaining the plate members in extended position.

Referring now more particularly to the drawings, reference numeral 10 indicates the front wall of the fishing tackle container, numeral 12 indicates the side walls, reference numeral 14 indicates the rear wall and reference numeral 16 indicates the bottom, all of which cooperate to present a rectangular open top container. A lid 18 or cover is hinged, as at 20, to the upper edge of the rear wall and a hasp 22 hingedly carried by the lid cooperates with a staple 24 on the front wall in providing a convenient means for maintaining the lid in closed relation.

Referring now more particularly to Figure 3, a sheet of material 26 is secured in juxtaposed relation to the inner surface of each side wall and vertically disposed on the inner surface thereof are a plurality of pairs of flanges 28 which present guides or tracks therebetween for the reception of opposite end portions of the vertical plates 30 and also of the forward plate 32 which differs from plates 30 in a manner presently apparent. One of the flanges 28 of each pair is provided with a transverse bore 34 into which is disposed a ball 36, a spring 38 and a plug 40, as most clearly shown in Figure 6. As will be readily apparent, the plug cooperates with the spring to normally urge the ball inwardly against the end portion of a plate disposed within the guide and the lower extremity of each plate is provided with an aperture 42 within which a corresponding ball is partially urged to latch the plate in an upwardly extended position when the plate has been slidably moved within the confines of the guide.

Each of the vertical plates 30 is provided on its front face with a plurality of spaced vertically disposed partitions 44 which extend therefrom and terminate in spaced relation to the next adjacent vertical plate sub-dividing the interior of the tackle box into a plurality of vertically elongated storage spaces. A pair of apertures or elongated slots 46 are provided between each pair of adjacent partitions and these apertures are adapted to receive the hook 48 of artificial fishing lure assemblies 50 to thereby suspend these assemblies within the confines of the various storage spaces. If the fishing lures are of sufficient small dimensions, a pair of them may be disposed within a single storage space by utilizing both of the apertures 46 or, only a single lure may be disposed within a single storage space if such lure is of sufficiently large dimension.

The rear face of the vertical plates 30 carry horizontal strips of cork 52 or other suitable resilient material and it will be readily apparent that these strips provide convenient means by which fishing flies may be carried by the simple expedient of embedding their hook end into the resilient material. In this manner, both the rear and front faces of each plate is utilized in carrying various fishing tackle.

The front plate 32 is provided with a plurality of open top receptacles 56 which are secured thereto by means of the angle brackets 58, these receptacles being provided for ease in carrying jars of bait, snells and the like.

The lower side edges of the tackle box are provided with spacing strips 60 upon which the lower edges of the various vertical plates abut to maintain the lower edges in slightly spaced relation to the bottom 16 for the purpose of permitting free circulation of air throughout the interior of the tackle box, allowing its contents to the full benefit of drying action of such air when the lid is upraised.

The above described tackle box provides a convenient means for storing a large number of fishing lures, flies, bait and the like which will positively be prevented from entanglement with each other and will be readily accessible by merely lifting individual ones of the plate members to its upwardly extended position wherein the fisherman's accessories carried thereby will be readily inspected for ease of selection. The partition 44 will prevent entanglement between the various accessories and will not allow them to become intermixed no matter what condition the tackle box may assume.

Since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A device of the character described comprising a container having a pair of side walls and a bottom, said side walls having a plurality of spaced guides, plate members extending between said side walls having their opposite ends vertically slidably received in corresponding guides, each of said plate members having a front face, vertical partitions extending from said front faces and terminating in spaced relation to adjacent plate members presenting storage spaces, and means for suspending fishing lures within said storage spaces.

2. The combination of claim 1 wherein said plate members are normally disposed and vertically slidably received in corresponding guides, each plate member having apertures or elongated slots to provide means for holding fishing lures in place.

3. The combination of claim 1 wherein said plate members are normally disposed in spaced relation to said bottom.

4. The combination of claim 3 wherein means are provided in said guides for maintaining said plate members in an extended position whereby the fishing lures suspended therefrom are readily accessible.

5. The combination of claim 1 wherein means is provided on the rear face of each of said plate members for removably carrying fishing flies.

6. The device as in claim 5 wherein said last means comprises a strip of resilient material into which the hooks of fishing flies may be embedded.

7. The combination of claim 1 wherein one of said plate members is provided with accessory receptacles on its front face.

References Cited in the file of this patent

UNITED STATES PATENTS

| | | |
|---|---|---|
| 1,339,231 | Stewart | May 4, 1920 |
| 1,501,448 | Gorrell | July 15, 1924 |
| 2,220,817 | Holmes | Nov. 5, 1940 |
| 2,573,431 | Gibson | Oct. 30, 1951 |
| 2,599,113 | Latta et al. | June 3, 1952 |